J. F. WINKLER.

REFRIGERATING APPARATUS.

APPLICATION FILED OCT. 14, 1916.

Reissued Dec. 18, 1917.

14,415.

3 SHEETS—SHEET 1.

Inventor—
Joseph F. Winkler
by his Attorneys—
Howson & Howson

J. F. WINKLER.

REFRIGERATING APPARATUS.

APPLICATION FILED OCT. 14, 1916.

Reissued Dec. 18, 1917.

14,415.

3 SHEETS—SHEET 2.

Inventor—
Joseph F. Winkler.
by his Attorneys—
Howson & Howson

J. F. WINKLER.

REFRIGERATING APPARATUS.

APPLICATION FILED OCT. 14, 1916.

Reissued Dec. 18, 1917.

14,415.

3 SHEETS—SHEET 3.

Inventor—
Joseph F. Winkler,
by his Attorneys—
Howson & Howson

UNITED STATES PATENT OFFICE.

JOSEPH F. WINKLER, OF PHILADELPHIA, PENNSYLVANIA.

REFRIGERATING APPARATUS.

14,415. Specification of Reissued Letters Patent. Reissued Dec. 18, 1917.

Original No. 1,164,438, dated December 14, 1915, Serial No. 871,926, filed November 13, 1914. Application for reissue filed October 14, 1916. Serial No. 125,753.

*To all whom it may concern:*

Be it known that I, JOSEPH F. WINKLER, a citizen of the United States, residing in Philadelphia, Pennsylvania, have invented a Refrigerating Apparatus, of which the following is a specification.

This invention relates particularly to automatically controlled refrigerating systems and one object is to provide a novel combination of apparatus especially designed to maintain constant the temperature in one or in any number of independent refrigerating compartments or chambers.

A further object of the invention is to provide a system of the above noted type which shall include means whereby the supply of cooling or condensing water shall be automatically controlled with a view to economizing its use, the invention also contemplating apparatus for the automatic shutting down of the compressor if the water supply should fail or be cut off for any reason.

I also desire to provide a relatively simple arrangement of apparatus for automatically controlling the flow of refrigerant or cooling liquid from a source of the same such as a container or cooler, through one or more independent compartments, with a view to maintaining the temperature therein at a predetermined relatively low point.

I further desire to provide a system with a novel arrangement of parts for preventing escape of refrigerant in case of a leak or breakage of the refrigerant-containing pipe at any of a number of points, for separating and returning to the compressor any lubricant which may have been carried away by the refrigerant and for generally causing the apparatus of the system to continue in operative condition for long periods of time with a minimum of attention or repairs.

These objects and other advantageous ends I secure as hereinafter set forth, reference being had to the accompanying drawings, in which:—

Figure 1:
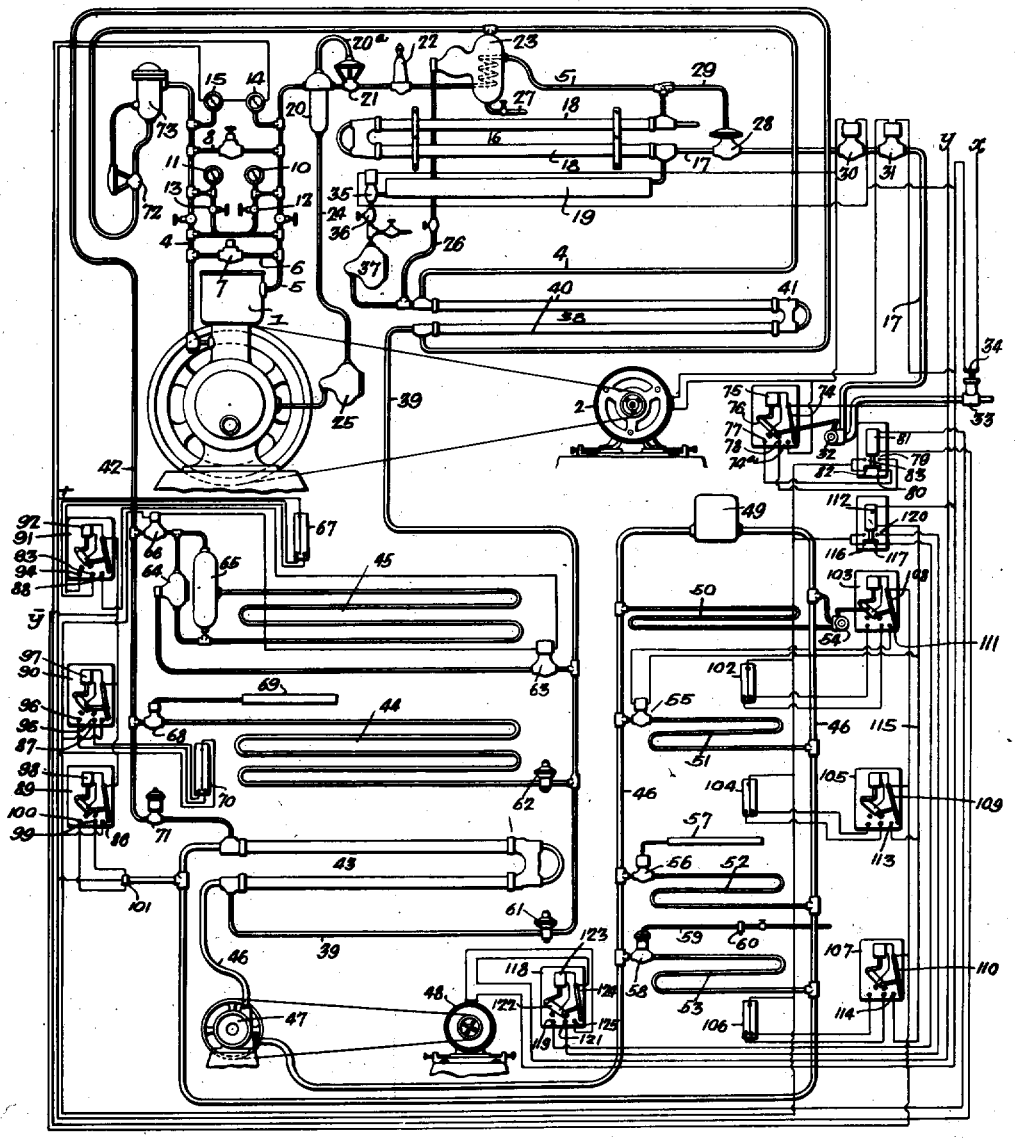
Figure 2:
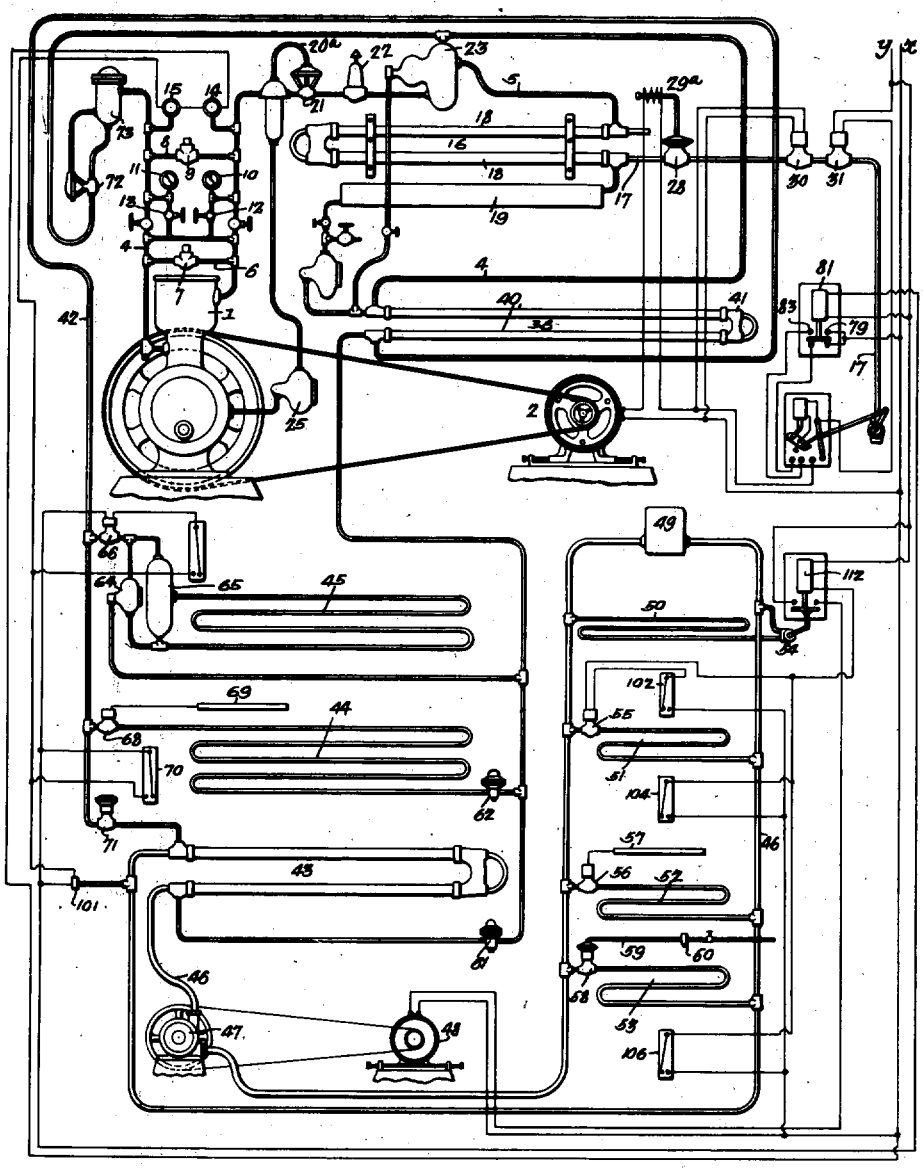
Figure 3:
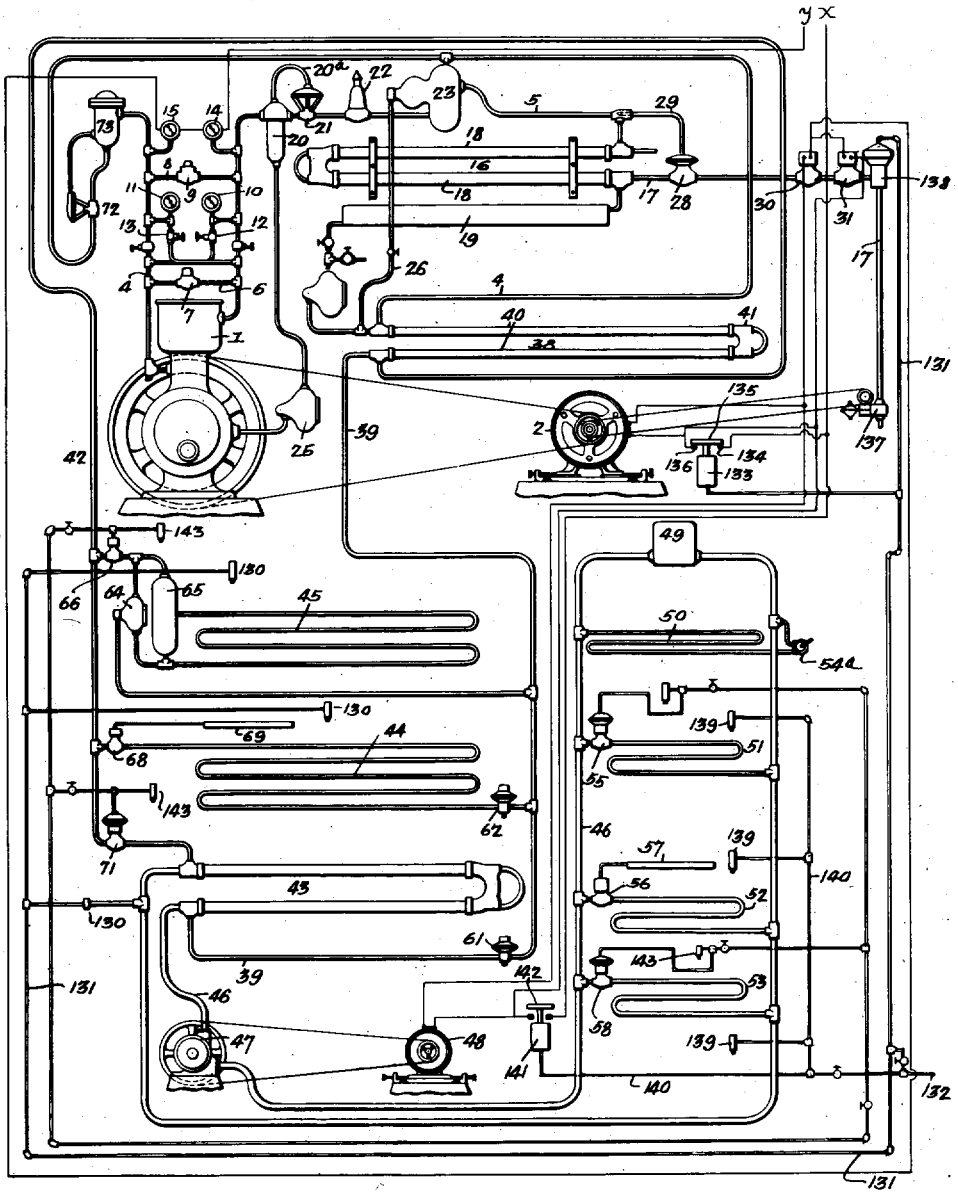

Figures 1, 2 and 3 are diagrammatic views illustrating slightly different systems constructed according to my invention.

In Fig. 1 of the above drawings, 1 represents a compressor driven from an electric motor 2, and designed to receive gaseous refrigerant such as ammonia, through an intake pipe 4, and deliver it in a compressed condition to a discharge pipe 5. Immediately adjacent the compressor these two pipes are connected to each other by a conduit 6 in which is included a safety valve 7, and said pipes are also connected by a second conduit 8, including an equalizing valve 9. This may be of any desired construction and is so designed that when the compressor 1 is shut down it will automatically equalize the pressure between the high and low pressure sides of the system though it will prevent such equalization when the compressor is in operation. For indicating the pressures in the two sides of the system I provide two gages 10 and 11 of which the first in addition to being connected permanently to the high pressure pipe 5, is also connected through a valve 12 with the low pressure pipe. The second gage is likewise permanently connected with the low pressure pipe 4, and is also connected through a stop valve 13 to the high pressure side.

Two automatic pressure actuated switches or cutouts 14 and 15 are so connected as to be actuated by fluid under pressure in the pipes 5 and 4 respectively as hereinafter described. The discharge pipe 5 of the compressor is arranged to deliver to a condenser 16 of any desired or suitable form and illustrated as of the double tube type which includes an interior pipe 17 connected through certain controlling valves to a source of water supply and having its outlet connected to a drain or receptacle for waste water. Each of the two lengths of this cooling tube is surrounded by a larger tube 18 and these two outer sections are connected at one end by a manifold. The second end of one of said sections 18 is connected to the discharge pipe 5 of the compressor, while the second end of the second section is connected to a suitable container or receptacle 19 for liquid refrigerant. That portion of the delivery pipe 5 between the connection for the cutout switch 14 and the condenser 16 has connected in it an oil separator 20, an automatic cutoff valve 21, an automatic air and gas extractor 22 and an automatic liquid refrigerant still and purifier 23. Of these pieces of apparatus the oil separator is designed to remove any oil which may be mixed with the liquid refrigerant delivered by the compressor and return it through a pipe 24 to the crank case of the compressor 1. In this conduit 24 is connected a trap 25 designed to automatically open to permit flow of liquid (which in this case is oil) to the crank case of the compressor and to automatically close to prevent passage of any gas thereto.

The upper part of the separator 20 is connected through a pipe 20a to deliver fluid under pressure to one side of the diaphragm of the valve 21 which is designed so as to automatically close if there should be a break in the system anywhere between the compressor 1 and the oil separator 20. The device 22 may likewise be of any suitable construction and is designed to separate air or other foreign gases from the refrigerant flowing through it. Between this extractor and the intake end of the condenser 16 is connected the still and purifier 23 which consists of a container having a conduit 26 connecting it to a point in the system from which liquid refrigerant may flow by gravity so that it is maintained in said container at a predetermined level above the point of entrance of the pipe 5 but below its point of exit. In order that gasses passing through said pipe may be compelled to heat said liquid, this container usually has mounted within it a float-controlled valve (not shown) whereby this constant level of refrigerant is maintained and is provided with a valved pipe 27 leading from its lowest portion to permit of the drawing off of any impurities which may separate out.

Connected in the water supply pipe 17 is a diaphragm valve 28 designed to control the flow of cooling medium through the condenser, its operation being governed by or dependent upon the action of a suitable thermostat in the pipe 5. The diaphragm or controlling chamber of this valve is connected to the thermostat tube containing volatile liquid by a branch pipe 29, and the arrangement is such that as the temperature of the gas in the pipe 5 rises, said valve is opened, it being caused to close when said temperature falls. Also connected in the water supply pipe are two electro-magnetic valves 30 and 31, a mechanically operated valve 32, and a device 33 consisting of a cylinder and plunger, designed to maintain an electric switch 34 closed as long as the pressure of water remains above a predetermined point. Any failure of this pressure causes automatic opening of said switch.

The outlet of the storage tank 19 is connected through an electro-magnetic valve 35, a stop valve 36 and a gas trap 37 to a device 38 for cooling the anhydrous liquid refrigerant which is shown as consisting of an inner conduit 39, and an outer conduit made in two sections 40 surrounding the same and connected at one end by a manifold 41. One end of one section is likewise connected to a pipe 42 receiving the vaporized gas or vapors of the refrigerant, while the second end of the other section is connected to the pipe 4, which as above noted connects with the intake of the compressor. It is noted that this return pipe is also connected to the top or gas space of the purifier 23. In the present instance I have shown the pipe 39 leading from the cooler 38 as connected to a brine cooler 43 and as also connected to a pair of coils 44 and 45 whose second ends are connected to the return conduit 42, as is also the second end of the brine cooler 43. This latter is illustrated as of the double tube type, although obviously it may be of any desired form and its brine containing pipe 46 includes a circulating pump actuated by an electric or any other suitable form of motor 48, there being also included in said pipe an expansion tank or chamber 49. As shown in the drawing, the endless circulating pipe 46 is arranged to include two portions substantially parallel and has connected between these any desired number of refrigerating coils 50, 51, 52 and 53. In the first of these is connected a mechanically operated valve 54, the second includes an electro-magnetic valve 55, the third includes a thermostatically actuated valve 56, designed to be operated by variations in the pressure of some volatile fluid contained in a tube or holder 57, while the fourth has connected in it a diaphragm-controlled valve 58 actuated from a suitable source of air through a supply pipe 59. This air pipe includes a thermostat 60 for governing the supply of air to said valve 58.

Connected in the pipe 39, adjacent the point where this delivers into the brine cooler 43, I provide a diaphragm controlled expansion valve 61 and also connect a second similar expansion valve 62 between said supply pipe 39 and coil 44. In the case of the coil 45, I connect an electro-magnetic valve 63, between its inlet and a float-controlled valve 64 and the chamber 65, in such manner that as long as said valve 63 remains open, the float-valve 64 maintains liquid refrigerant in the chamber 65 and hence in the coil 45, which has both ends connected thereto at a predetermined level. The upper or gas containing portions of the valve 64 and chamber 65 are connected through suitable conduits to an electro-magnetic valve 66 which in turn is connected to the return gas pipe 42, the operation of this valve being in part controlled by a switch actuating thermostat 67 mounted in the compartment containing the coil 45. Similarly coil 44 is connected to the return pipe 42 through an automatic stop valve 68, governed by variations in the pressure of fluid within a container 69, constituting a thermostat within the chamber or compartment having the coil 44 and also designed to cause opening of the valve to permit of passage of gaseous refrigerating medium whenever the temperature in its vicinity rises above a predetermined point. Also within said compartment of the coil 44 is mounted a switch-controlling thermostat 70. Adjacent the outlet of the refrigerant containing section of the brine cooler 43 I connect a diaphragm-controlled valve 71, for stopping off the gaseous refrigerating medium on its way to the compressor 1 as it is formed from the liquid in said cooler.

In the pipe 4, between the liquid cooler 38 and the compressor, I connect an automatic pressure-controlled valve 72 and a safety trap 73, the first of these being arranged to automatically shut off the refrigerant in case of a break between it and said compressor and the latter being provided with a mechanism, (not shown) for preventing passage of liquid to the intake of the compressor, the arrangement being such that the valve 72 is actuated by a reduction of the pressure in device 1.

For controlling the circuit of the motor 2, I connect one of its terminals to a current supply main $x$ through the pressure controlled switch 34 and the winding of the electromagnetic valve 31, while its second terminal is connected to the second current supply main $y$ through a solenoid switch 74. This latter switch is controlled by a solenoid 75, one terminal of whose winding is permanently connected to the current supply main $y$ while its second terminal is connected to a movable switch member 76, capable of engaging either of two contacts 77 and 78 respectively connected to a pair of contacts 79 and 80 of a relay switch having a winding 81. The movable member of this switch is so arranged that when said winding is deenergized it connects the contact 80 with a second contact 82 and when energized, connects the contact 79 with a contact 83. In passing it may be noted that the valve 32 is connected to be mechanically actuated by movement of the switch arm 76, under the action of the solenoid 75.

The winding of the relay switch has one terminal connected through the automatic cutoffs 14 and 15 to the current supply main $x$ and its second terminal is connected to the contacts 86, 87 and 88 of three solenoid switches 89, 90 and 91, the connection to the contacts 88 being made through the windings of the two electro-magnets controlling the valves 63 and 66. The winding 92 of the switch 91 has one terminal permanently connected to the current supply main $y$ and its other connected to its movable contact arm which is so mounted as to be capable of engaging either of two contacts 93 or 94. These are respectively connected to the two fixed contact points of the thermostat 67 whose movable contact is permanently connected to the current supply main $x$; it being understood that this thermostat is so mounted as to be actuated by changes of temperature in the compartment containing the refrigerating coil 45. Similarly, the compartment having the coil 14 is shown as also containing the expansive fluid thermostat 69 and also the switch actuating thermostat 70. The movable contact of this latter thermostat is permanently connected to the current supply main $x$ while its two fixed contacts are respectively connected to the contacts 95 and 96 of the solenoid switch 90, to whose movable arm is connected one terminal of its winding 97. The second terminal of this winding, as well as one terminal of the solenoid switch 89 is permanently connected to the current supply main $y$ and the second terminal of this latter winding is connected to the switch arm actuated by it. This arm is capable of engaging either of the contacts 99 or 100 respectively connected to the two fixed contacts of a thermostat 101, placed to be actuated by changes of temperature in the brine circulated in the pipe 46. The fixed contact of this thermostat is permanently connected to the current supply main $x$.

Of the three compartments cooled respectively by the coils 51, 52 and 53, the first contains a thermostat 102, connected to a solenoid switch 103, the second has a thermostat 104 connected to a switch 105 and the third has a thermostat 106 connected to a switch 107. In each instance the thermostat has its movable contact permanently connected to the current supply main $x$ and has its two fixed terminals respectively connected to a pair of contacts so placed on their particular switch as to be capable of engagement by the movable arm which is actuated by the solenoid of said switch. One end of each of the switch solenoids is connected to this movable arm and its second end is connected to the current supply main $y$. Further, each of the movable arms of these switches has mechanically connected to it a second arm indicated respectively at 108, 109 and 110. Each of these arms is permanently connected to the current supply main $y$ and when the coil 103 is energized the first of them is movable into engagement with a contact 111 connected to one end of the winding of the electro-magnetic valve 55, whose second end is connected to a conductor leading to one end of the solenoid winding of a second relay switch 112. The contacts 113 and 114, which are so mounted as to be capable of engagement by the arms 109 and 110 of the switches 105 and 107 respectively, are likewise connected to this same conductor 115. The second end of the solenoid winding of the relay 112 is connected to the current supply main $x$ and when this winding is deenergized the contact member carried by its core connects the contact 116 and therefore the current supply main $x$, with a second contact 117 and with the contact 119 of the solenoid switch 118, while when this coil is energized the movable contact connects the current supply main $x$ with a contact 120, which in turn is connected to a contact 121 of said switch 118. This latter is provided with a movable contact arm 122 capable of engaging either of the contacts 119 and 121 and to it is connected one end of the winding 123 of the switch 118, whose second end is connected to the current supply main $y$. As in the case of the other solenoid switches heretofore described, the movable arm 122 of the switch 118 is mechanically connected to a second arm 124 which in one position is capable of engaging a contact 125 connected to one terminal of the motor 48, whose second terminal is directly connected with the current supply main $x$.

Under operating conditions, if a suitable amount of anhydrous ammonia or other refrigerant be supplied to the high pressure side of the system so that it will flow from the container 19, for example, into the pipe 39, after passing the expansion valve 62, it will become vaporized in the well known manner within the coil 44, and lower the temperature in the compartment in which this is situated, passing through the valve 68 into the return pipe 42. When the temperature in this compartment falls to a predetermined point the fluid in the thermostat 69 acts on this valve 65 to wholly or partly close the same so that further flow of gas is cut off or diminished to such an extent that the temperature in the compartment is maintained at said low point as desired. Similarly, the anhydrous ammonia, after passing the expansion valve 61 is vaporized in the cooler 43 and lowers the temperature of the brine in the pipe 46 to a point determined by the thermostat 101 as hereafter explained.

The refrigerant also flows from the pipe 39 through the normally open valve 63 to the float chamber 64 and thence into the container 65 and coil 45, from whence the vapor generated passes through the valve 66 to the return pipe 42 which also receives the vapor from the cooling coil 43. As long as the temperature in the compartments cooled by the coils 44 and 45, as well as the temperature of the brine in the pipe 46, is below a predetermined point, the three thermostats 67, 70 and 101 have their movable contacts in engagement with those fixed contacts which in the present instance are connected to the switch contacts 94, 96 and 100 respectively. When, however, the temperature in one of these compartments rises above the predetermined low point, the movable member of its thermostat,—for example that indicated at 67, so moves as to connect the contact 93 of the switch 91 with the current supply main $x$ and as a result current flows from this main through the solenoid winding 92 to the supply main $y$ causing the movable blade of said switch to move from the contact 93 to the contact 94. This open circuits said solenoid winding, and at the same time connects the contact 88 through the swinging arm of the switch, with the current supply main $y$. The current is then free to flow from the current supply main $x$, through the cutoffs 14 and 15, relay winding 81, magnet windings 66 and 63, and contact 88 to the supply main $y$ with the result that the core of said winding is raised, thereby breaking the connection between the contacts 80 and 82 and completing it between the contacts 79 and 83. The current is then free to flow from the supply main $x$ between contacts 83 and 79, thence to contact 78, blade 76, solenoid winding 75 and to the current supply main $y$, causing said blade to engage the contact 77, and the arm 74 to be swung into engagement with the contact $74^a$. The current is then free to flow from the supply main $x$ through the winding of the valve 31 to the motor 2, and thence through contact $74^a$ and blade 74 to the supply main $y$. The motor 2 and the pump 1 are therefore put in operation and ammonia vapor is drawn into the cylinder of said pump, where it is compressed and ultimately delivered in liquid form to the receiver 19. From here it passes through the cooler 38 and thence through the pipe 39 and valve 63 to the container 64 from which it passes into the coils 45, where it cools the compartment in which said coils are mounted.

When the temperature of said compartment has been reduced by this action to a predetermined point, the movable member of the thermostat 67 engages the second fixed contact thereof thus again energizing the solenoid winding 92, with the result that the movable blades or switch arms controlled by said winding are returned to the positions shown in the drawing. The relay winding 81 is therefore open circuited and the falling of its core permits the movable contact carried thereby to electrically connect the contacts 82 and 80 thus again energizing the solenoid winding 75. The movable arms or blades 74 and 76 controlled by said winding are then likewise returned to their original positions, open circuiting the motor 2 and stopping the pump 1.

It is noted that the first operation of the solenoid 75 causes opening of the valve 32 which is mechanically connected to its blades so that coincident with the starting of the pump, water is permitted to flow through the supply pipe 17 to cool the gas in the pipe 18.

As long as water from the source thereof is delivered at the predetermined pressure necessary for the proper operation of my system, the device 33 is so acted on that the switch 34 is kept closed, but if for any reason the water supply should fail, this switch will automatically open, thus cutting off the current supply throughout the entire system and causing it to automatically shut down. It will be noted that the valve 31 has its actuating winding connected in series with the circuit of the motor 2 so that a cessation of the current flow in said motor circuit will cause closure of this valve and a stoppage of the circulation of water. The two valves 30 and 35 have their actuating windings connected in multiple with the motor circuit so that they will not interfere with the flow of water in the pipe 17 nor with the delivery of ammonia from the container 16 except upon opening of the switch 34 as above noted.

By reason of the fact that the valves 63 and 66 are in the circuit which includes the relay winding 81, any opening of the switch governed by the latter will at once cause closure of these valves, so that liquid ammonia cannot be delivered to the container 64 nor can ammonia gas pass to the return pipe 42 except when this switch is closed. In case the pressure in the high pressure side of the system should become excessive, the cutoff 14 is automatically actuated to open the circuit of the relay 81, and hence of the motor, while the cutoff 15 is designed to perform the same work in the event of the pressure of the low pressure side of the system falling beyond a predetermined point.

Obviously the operation of the thermostat 70 in the compartment containing the coil 44 would cause operation of the motor and pump until the temperature of said compartment had been brought down to the predetermined low point, whereupon the motor circuit would be automatically opened by the action of the switch 90. By means also of the thermostat 101 the motor and pump may be automatically caused to start through the operation of the switch 89 and the relay 81, and in case the thermostats 67 and 70 should simultaneously operate to cause starting of the pump, the latter would remain in operation until the last one of said thermostats had returned to its original position, when as above described, the motor would be automatically caused to shut down.

As long as the temperature of any of the compartments containing the coils 50, 51, 52 and 53 is above the predetermined point, the thermostat of said compartment would have its movable member in engagement with one of the fixed contacts and in the case of the thermostat 102 for example, current would be free to flow from the current supply mains to energize the solenoid winding of the switch 103, whereupon current would flow from the main $x$ through the switch 34, solenoid 112, winding of valve 55, contact 111, blade 108, and to the supply main $y$. The consequent raising of the core of said solenoid then permits current to flow from the supply main $x$ through the solenoid 123 to the supply main $y$ so actuating the switch 118 that the motor 48 is put in operation and the circulating pump 47 is started. The cold brine in the pipe 46 is thus caused to circulate through the coil 51 to the exclusion of the coils in the other compartments since the valve 55 is the only one open. Said circulation continues until such time as the thermostat 102 again causes operation of the switch 103 with deënergization of the relay 112 and such an operation of the switch 118 as will shut down the motor 48.

In the case of the compartment having the coil 50 the switch 103 is caused to mechanically operate the valve 54, while in the case of the compartment having the coil 52, the thermostat 57 directly controls the valve 56 so that this is automatically opened when the temperature rises above a predetermined point, and closed when said temperature falls to the same or another point. In the case of the compartment having the coil 53, the thermostat 60 automatically controls the escape of gas under pressure from the pipe 59 so that cold brine is admitted to the coil when the temperature of said compartment rises;—the motor 48 and pump 47 being controlled by the thermostat 106 as in the case previously described.

Under operating conditions the trap 25 acts automatically to return to the crank case any oil collected from the gas passing through the discharge pipe 5 so that said oil is not carried into and deposited within the other parts of the system. The trap 37 likewise automatically acts to prevent passage of gas from the condenser 16 and container 19 into cooler 38 or pipe 39, for as long as liquid is delivered to it, it is free to pass out to the cooler 38. If for any reason gas should flow into it, by means of a float valve (not shown), communication with the cooler 38 would be at once automatically cut off.

From the foregoing description it will be understood that provision is made for preventing waste of water when the pump 1 and motor 2 are shut down, since under this condition, both valves 30 and 31 are closed by reason of the deënergization of their controlling magnet windings. It will be further noted that by my invention, the circulation of brine through the pipe 46 and the cooling coils connected therewith is automatically controlled by electric mechanism dependent for its operation upon the temperature in the compartments containing said coils, the operation of the circulating pump being dependent upon the energization of a master controller, (*i. e.* the relay) whereby said pump is caused to operate as long as the temperature of any one of the compartments is above a predetermined point. Similarly a master controller governs the operation of the compressor 1, causing it to start or stop in accordance with the temperature conditions existing in any one of a number of refrigerating compartments. Obviously the passage of ammonia from the container 19 is possible only while the motor 2 is in operation since under other conditions the coil of the valve 35 is open circuited and said valve is closed.

In that form of my invention shown in Fig. 2 I have illustrated the various thermostats of the compartments containing the coils 43, 44 and 45 as connected in multiple with each other and directly in the circuit with the relay solenoid 81, so that the operation of any of said thermostats caused by the rise of temperature in these compartments above the predetermined point, causes energization of said solenoid and a raising of its core, the contacts 79 and 83 are thereby connected and the motor 2 is started as previously described. Similarly, the raising of the temperature in any of the compartments containing the coils 50, 51 and 53 results in the operation of a thermostat to close the circuit of the relay winding 112, the raising of whose core directly closes the circuit of the motor 48 driving the circulating pump 47. In this case the valve 54 controlling the flow of cooling fluid through the coil 50 is designed to be mechanically operated by a movable member of the relay switch whose winding is illustrated at 112.

In Fig. 3 I have illustrated my system as designed for operation in connection with a series of of thermostats controlling the escape of air under pressure from suitable pipe lines. In this case each of the compartments containing the coils 43, 44 and 45 is provided with a thermostat 130, which, when the temperature rises above the predetermined limit permits the escape of air from a conduit 131, receiving air from an air main 132 and connected to a cylinder 133 whose plunger carries a switch blade 134 capable of connecting a pair of contacts 135 and 136. These are connected in circuit with the motor 2 and the arrangement is such that the pressure in the conduit 131 normally holds the switch blade 134 out of engagement with the contacts 135 and 136. When, however, any of the thermostats 130 permits escape of air by reason of a rising of the temperature in its compartments to a predetermined point, said blade connects these contacts thereby permitting current to flow from the supply main *x* through the motor, through the valve 30, cutoffs 15 and 14 to the supply main *y*. In this case, the supply pipe 17 for the cooling water has connected in it a valve 137 controlled by a centrifugal governor driven from the motor 2 and so arranged that operation of said motor causes the valve to open while its stoppage permits it to close. In addition this water supply line includes a diaphragm-controlled valve 138 connected to be held closed as long as the air within the conduit 131 remains under full pressure, though whenever the air pressure falls in this conduit, this valve automatically opens. In this arrangement of my system, each of the compartments for the coils 51, 52 and 53 contains also a thermostat 139 which, when the temperature rises to a predetermined point permits escape of air from the conduit 140, thus allowing a plunger 141 to fall and causing the blade of a switch 142 to complete the circuit of the motor 48, so that this latter will start the pump 47. Cold brine is thus circulated through the compartment containing said thermostat until its temperature is again lowered sufficiently to cause the thermostat to cut off further escape of air, whereupon the air pressure in the conduit 140 raises the blade of switch 142 and breaks the circuit of the motor 48.

In the case of the compartment 45, there is provided a second thermostat 143 whose air pipe is connected to the gas controlling valve 66 in such manner as to cause opening of said valve when the temperature rises above the allowable limit and to close it when it falls below the same. The same general arrangement is provided in the compartment containing the coil 44 except that the valve 71 is of a different construction. Each of the compartments containing the coils 51 and 53 likewise contains a thermostat 143 whose air pipe is so connected to the controlling valve 55 or 58, as the case may be, that the latter is opened to permit flow of brine whenever the temperature rises above the allowable limit. In this case the coil 50 is shown as provided with a manually controlled valve 54ª.

In the system illustrated in Fig. 2, I have shown the diaphragm valve 28 as connected to a tube 29ª containing a relatively volatile liquid, and having a heating coil in series with the motor 2. With such an arrangement, whenever said motor is put into operation the heating of the tube 29ª by said coil causes vaporizing of the liquid and opening of the valve, with consequent flow of water to the condenser. The shutting down of the motor and consequent cooling of the coil permits the valve to close, thus stopping the water flow through the pipe 17.

It will be noted that with the above described combination of thermostats and automatic switch, the current flows only for an instant for the operation of the switch not only opens the circuit closed by the thermostat but so causes the engagement of two contacts, included in the circuit that the latter will be completed by said thermostat when its movable member engages the second fixed contact. All the thermostat circuits therefore are normally open so that there is no waste of current.

By using such a device as that indicated at 23, I am enabled to gradually and continuously purify the ammonia within the system, for the hot gas passing through the pipe 5 heats the liquid which is maintained within this device at a predetermined depth, it being understood that such liquid is forced through the pipe 26 and is held at said level by a suitable float controlled valve. The vapor rising from this heated liquid passes out into the pipe 4 and from thence is drawn to the inlet of the compressor, while the non-volatile constituents of the liquid entering the chamber 23 may at suitable intervals be discharged through the pipe 27. Thus as long as the system is in use, all impurities in the shape of objectionable liquids are successfully removed without loss of ammonia and without requiring any special attention on the part of the operator.

I claim:—

1. The combination in a refrigerating apparatus of a compressor; a condenser connected to receive compressed gas therefrom; an expansion pipe connected to receive liquid refrigerant from the condenser and connected to deliver the expanded gas to the compressor; a brine containing system associated with said expansion pipe; a plurality of compartments to be cooled by said brine system; a temperature responsive device in each of said compartments; a brine circulating device; and means including a master controller for automatically starting the brine circulating device when the temperature in any compartment rises above a predetermined point.

2. The combination in a refrigerating apparatus of a plurality of compartments to be cooled; a coil in each of said compartments; a temperature responsive device in each of said compartments; a master controller connected to respond to any of said temperature controlled devices; and means governed by the master controller for automatically causing refrigerant to be delivered to any of said coils when the temperature in the compartment containing the same rises above a predetermined point.

3. The combination in a refrigerating apparatus of a series of compartments; refrigerating coils respectively in said compartments; thermostats respectively in the compartments; switches controlled by said thermostats respectively; a master controller governed by said switches; and motor controlled means for governing the supply of refrigerant to the coil, the same being connected to be governed by said master switch.

4. The combination in a refrigerating apparatus of a compressor, a motor for driving the same, a condenser connected to receive gas compressed thereby, a conduit for delivering water to the condenser, a system of pipes in which liquid refrigerant is expanded to produce a low temperature, a valve for controlling the flow of water to the condenser, and temperature actuated means for controlling the operation of the compressor, the same consisting of a thermostat, a switch controlled by said thermostat, and means for connecting the movable element of the switch to the valve for causing closing of the valve when the compressor is idle and opening of the valve when the compressor is in operation.

5. The combination in a refrigerating apparatus of a compressor, a condenser connected to receive gas compressed thereby, a conduit for delivering water to the condenser, a system of pipes in which liquid refrigerant is expanded to produce a low temperature, a motor for driving said compressor, an automatic switch for controlling the motor, and a valve mechanically connected to the switch for controlling the flow of water in said conduit.

6. The combination in a refrigerating apparatus of a compressor, a condenser connected to receive gas compressed thereby, a system of pipes in which liquid refrigerant is expanded to produce a low temperature, a valve connected between said system and the condenser, a motor for driving the compressor, and an electro-magnetic device for operating said valve connected to automatically open the same when the motor starts and to close the valve when the motor shuts down.

7. The combination in a refrigerating apparatus of a compressor, a motor for driving the same, a condenser for receiving the gas delivered from the compressor, a system of pipes in which liquid refrigerant is expanded to produce a low temperature, a valve between the condenser and said system, an electro-magnetic device for actuating said valve, and a switch connected to the motor and to said valve controlling device.

8. The combination in a refrigerating apparatus of a brine cooling device; circulating pipes connected to said device; means for causing flow of brine through the system including a pump and an electric motor for driving same, with a controlling switch for said motor; and a valve mechanically actuated by said switch for controlling the flow of brine in the system.

9. The combination in a refrigerating apparatus, of a brine cooling device, a system of conduits connected thereto and extending into a series of compartments to be cooled, a pump for circulating brine in said system, a motor for driving said pump, a relay switch for controlling said motor, and a series of switches automatically responsive to variations of temperature in the several compartments all connected so that any one of them may cause operation of the relay switch with consequent starting of the motor.

10. The combination in a refrigerating apparatus of a brine cooling device, a system of conduits connected thereto and extending into a plurality of compartments to be cooled, a pump for circulating the brine, a motor for driving the pump, a thermostat for each of said compartments, a switch controlled by each thermostat, and a relay switch connected to be operated by any one of said switches for starting the motor when the temperature in any compartment rises above a predetermined point.

11. The combination in a refrigerating apparatus of a compressor; a condenser connected thereto; an expansion system connected between the condenser and the intake of the compressor; and an automatic device heated by the hot gas from the compressor for distilling liquid delivered from the condenser.

12. The combination in a refrigerating apparatus of a compressor; a condenser; an expansion system connected between the intake of the compressor and said condenser; a pipe connecting the condenser with the outlet of the compressor; with a vessel heated by said pipe and connected to deliver gas generated by the heat from said conduit to the intake of the compressor.

13. The combination in a refrigerating apparatus of a compressor; a condenser; an expansion system connecting said condenser with the intake of the compressor; a conduit connecting the outlet of the compressor to the condenser; a container heated by said conduit and connected to receive liquid from the condenser; a discharge pipe leading from the lower part of said container; and a conduit for delivering gas from the upper part of the container to the intake of the compressor.

14. The combination in refrigerating apparatus of a source of refrigerating medium; a plurality of conduits connected thereto and extending into compartments to be cooled; a motor actuated device for causing circulation of the refrigerating medium through said conduits; a thermostat for each compartment; and an electro-magnetic switch controlled by each thermostat; with a relay controlled by said switches and governing the operation of the motor of the circulating device.

15. The combination in refrigerating apparatus of a source of refrigerating medium; a plurality of conduits connected thereto and extending into compartments to be cooled; a motor actuated device for causing circulation of the refrigerating medium through said conduits; a thermostat for each compartment; an electro-magnetic switch controlled by each thermostat; with a relay controlled by said switches and governing the operation of the motor of the circulating device, said relay being connected to maintain the motor in operation until all of said switches are open.

16. The combination in refrigerating apparatus of a source of refrigerating medium; a plurality of conduits connected thereto and extending into compartments to be cooled; a motor actuated device for causing circulation of the refrigerating medium through said conduits; a thermostat for each compartment; an electro-magnetic switch controlled by each thermostat; a relay controlled by said switches and governing the operation of the motor of the circulating device; with an electro-magnetic valve connected in one of the conduits and having its winding in circuit with the winding of the relay.

17. The combination in a refrigerating apparatus of a compressor; a motor for driving the same; a condenser for receiving the gas delivered from the compressor; a system of pipes in which liquid refrigerant is expanded to produce a low temperature; a valve between the condenser and said system; an electro-magnetic device for actuating said valve; a switch connected to control the delivery of current to the motor and to said valve controlling device; a water supply conduit for the condenser; and a device controlled by water pressure in said conduit for governing the operation of said switch.

18. The combination in refrigerating apparatus of a plurality of conduits extending into compartments to be cooled; a motor actuated device; a thermostat for each compartment; an electro-magnetic switch controlled by each thermostat; a relay controlled by said switches and governing the operation of the motor of said device; with a valve connected in one of the conduits and having operating means controlled by the relay.

19. The combination in refrigerating apparatus of a plurality of conduits extending into compartments to be cooled; a motor actuated device; a thermostat for each compartment; an electro-magnetic switch controlled by each thermostat; a relay controlled by said switches; with a switch governed by the relay and connected to control the motor.

20. The combination in refrigerating apparatus of a compressor; a condenser connected to receive gas therefrom; a cooling conduit for the condenser; a valve in said conduit; and temperature responsive means for controlling said valve, the same consisting of a thermostat exposed to the action of gas flowing from the compressor to the condenser.

21. The combination in refrigerating apparatus of a compressor; a condenser connected to receive gas from said compressor; a cooling conduit for the condenser; a valve controlling the flow of fluid in said conduit; a thermostat acted on by hot gas from the compressor; and means connecting said thermostat with the valve to hold the latter open only when the thermostat is exposed to a temperature above a predetermined point.

JOSEPH F. WINKLER.